(12) United States Patent
Zhao

(10) Patent No.: US 11,686,303 B2
(45) Date of Patent: Jun. 27, 2023

(54) PUMP ASSEMBLY AND HIGH-PRESSURE CLEANING APPARATUS

(71) Applicant: Globe (Jiangsu) Co., Ltd, Jiangsu (CN)

(72) Inventor: Chunlin Zhao, Jiangsu (CN)

(73) Assignee: Globe (Jiangsu) Co., Ltd, Changzhou (CN)

( * ) Notice: Subject to any disclaimer, the term of this patent is extended or adjusted under 35 U.S.C. 154(b) by 237 days.

(21) Appl. No.: 16/906,144

(22) Filed: Jun. 19, 2020

(65) Prior Publication Data

US 2020/0400139 A1 Dec. 24, 2020

(30) Foreign Application Priority Data

Jun. 19, 2019 (CN) .......................... 201910529505.X

(51) Int. Cl.
*F04B 53/08* (2006.01)
*F04B 17/03* (2006.01)
(Continued)

(52) U.S. Cl.
CPC .............. *F04B 53/08* (2013.01); *F04B 17/03* (2013.01); *F04B 53/16* (2013.01); *H02K 5/10* (2013.01);
(Continued)

(58) Field of Classification Search
CPC .............. B08B 3/02; B08B 2203/0223; B08B 2203/0235; F04B 9/02; F04B 9/045;
(Continued)

(56) References Cited

U.S. PATENT DOCUMENTS 3,520,270 A 7/1970 Miller
5,071,069 A * 12/1991 Stirm ...................... B08B 3/028
239/128
(Continued)

FOREIGN PATENT DOCUMENTS

EP 1122411 A2 8/2001
WO 9214060 A1 8/1992

OTHER PUBLICATIONS

Extended Search Report of Counterpart European Patent Application No. 20446501.7 dated Oct. 27, 2020.

*Primary Examiner* — Devon C Kramer
*Assistant Examiner* — Joseph S. Herrmann

(57) ABSTRACT

The invention provides a pump assembly and high-pressure cleaning apparatus. The pump assembly comprises a motor, a transmission assembly driven by the motor, a water pump connected with the transmission assembly, and a water flow passage. The transmission assembly comprises a sealing portion, a heat dissipating portion capable of dissipating heat to the sealing portion, and a transmission structure arranged in the sealing portion. A lubricating medium is injected in the sealing portion, and the heat dissipating portion is in fluid communication with the water flow passage. The pump body is provided with a heat dissipating portion capable of dissipating heat to the sealing portion, so that the heat generated by the transmission structure in the sealing portion can be dissipated through flowing-out of water in the heat dissipating portion to achieve a heat dissipating effect of the pump assembly.

20 Claims, 11 Drawing Sheets

(51) Int. Cl.
*H02K 5/10* (2006.01)
*H02K 5/18* (2006.01)
*F04B 53/16* (2006.01)
*H02K 5/20* (2006.01)
*B08B 3/02* (2006.01)
*F04B 9/02* (2006.01)

(52) U.S. Cl.
CPC ............... *H02K 5/18* (2013.01); *H02K 5/203* (2021.01); *B08B 3/02* (2013.01); *F04B 9/02* (2013.01)

(58) Field of Classification Search
CPC .......... F04B 17/03; F04B 53/08; F04B 39/06; F04B 39/064; H02K 5/10; H02K 5/18; H02K 5/20; F16H 57/04; F16H 57/0412; F16H 57/0476; F16H 57/0493; F16H 57/0495; F16H 2700/00; F16H 57/0413
USPC .................................. 417/367, 369, 370, 371
See application file for complete search history.

(56) References Cited

U.S. PATENT DOCUMENTS

| | | | | |
|---|---|---|---|---|
| 5,181,837 | A * | 1/1993 | Niemiec | H02K 5/12 |
| | | | | 417/372 |
| 5,250,863 | A * | 10/1993 | Brandt | H02K 5/203 |
| | | | | 310/87 |
| 5,354,182 | A * | 10/1994 | Niemiec | F01C 21/007 |
| | | | | 417/423.15 |
| 6,554,584 | B2 * | 4/2003 | Takura | F04D 3/02 |
| | | | | 241/46.11 |
| 7,628,586 | B2 * | 12/2009 | Feher | F04D 29/284 |
| | | | | 415/200 |
| 9,297,454 | B2 * | 3/2016 | Barthel | F16H 57/0495 |
| 2008/0044298 | A1 | 2/2008 | Laski | |
| 2010/0018672 | A1 * | 1/2010 | Yang | F28D 7/0008 |
| | | | | 165/104.11 |
| 2010/0047091 | A1 | 2/2010 | Schiffhauer et al. | |
| 2011/0081261 | A1 * | 4/2011 | Klika | B05B 9/002 |
| | | | | 417/364 |
| 2012/0034111 | A1 | 2/2012 | Schiffhauer et al. | |
| 2013/0263899 | A1 | 10/2013 | Dirnberger et al. | |
| 2014/0154112 | A1 * | 6/2014 | Nathan | F04D 29/588 |
| | | | | 417/366 |
| 2015/0048700 | A1 * | 2/2015 | Liu | H02K 5/20 |
| | | | | 310/54 |
| 2016/0151133 | A1 | 6/2016 | Luettgen et al. | |
| 2018/0328349 | A1 * | 11/2018 | Wu | F04B 19/22 |

* cited by examiner

PUMP ASSEMBLY AND HIGH-PRESSURE CLEANING APPARATUS

CROSS-REFERENCE TO RELATED APPLICATIONS

This application is a US application which claims the priority of CN Application Serial No. 201910529505.X, filed on Jun. 19, 2019, the disclosures of which are hereby incorporated by reference in their entirety.

TECHNICAL FIELD

The present invention relates to the field of machinery, and more particularly to a pump assembly and a high-pressure cleaning apparatus having the pump assembly.

BACKGROUND ART

At present, the motor of the hand-held pressure washer on the market mostly uses an air-cooled brush motor, and the air-cooled brush motor has the following disadvantages: on the one hand, since the brush motor has an open structure and low waterproof level, the safety regulation which requires the raining test of hand held pressure washer reaching IPX5 or above can't be met, on the other hand, due to the air-cooled brush motor has low efficiency, more heat, poor cooling and insufficient motor power, the user's high performance of the pressure washer's need can't be met.

In terms of transmission system, most of the current hand-held pressure washer adopt the structure of planetary gear decelerating transmission and crank-link piston transmission. The general transmission structure uses grease lubrication, which has the characteristics of poor lubrication, high noise and high heat generation, which results in the performance of the motor pump is difficult to improve.

In view of this, it is necessary to design an improved pump assembly and a high-pressure cleaning apparatus having the pump assembly to solve the problems.

SUMMARY OF INVENTION

It is an object of the present invention to provide a pump assembly having a good heat dissipating effect and a high-pressure cleaning apparatus having the pump assembly.

In order to achieve the above object, the present invention provides a pump assembly comprising: a motor; a transmission assembly driven by the motor and including a sealing portion, a transmission mechanism received in the sealing portion and a heat dissipating portion connected to the sealing portion for transferring heat with the sealing portion; and a water pump connected to the transmission assembly.

As a further improved technical solution of the present invention, the heat dissipating portion has a water inlet and a water outlet both for water passing to dissipate heat generated by the transmission mechanism.

As a further improved technical solution of the present invention, a water passage is formed between the water inlet and the water outlet, and wherein a transmission assembly water flow passage is formed together by the water inlet, the water outlet and the water passage.

As a further improved technical solution of the present invention, a plurality of metal heat dissipating ribs are disposed in the water passage and wherein the water outlet is connected to the water pump.

As a further improved technical solution of the present invention, the water passage is configured with an annular shape, and wherein the metal heat dissipating ribs are uniformly distributed in the water passage.

As a further improved technical solution of the present invention, the motor comprises a main body portion, a first and second end covers respectively disposed on two opposite end of the main body portion, and wherein the motor has a motor water passage for water passing to dissipate heat.

As a further improved technical solution of the present invention, the first end cover defines a first water channel for water passing, and wherein the main body portion defines a second water channel fluidly communicating with the first water channel, and wherein the second end cover defines a third water channel fluidly communicating with the second water channel.

As a further improved technical solution of the present invention, a motor water channel is formed by the first water channel, the second water channel and the third water channel.

As a further improved technical solution of the present invention, the first end cover defines a water inlet connector communicating with the first water channel, and wherein the second end cover defines a water outlet connector communicating with the third water channel and engaging with the water inlet of the heat dissipating portion.

As a further improved technical solution of the present invention, at least two water baffle plates are disposed in the first water channel for the water uniformly passing the second water channel, and wherein a plurality of heat dissipating ribs are located in the second water channel, and wherein the second water channel is divided into a plurality of sub-channels which are uniformly distributed along a circumferential direction of the main body portion.

As a further improved technical solution of the present invention, the water pump comprises a pump body and a water outlet body connected to the pump body, and wherein the pump body has an inlet hole connected to the water outlet of the transmission assembly and an outlet hole communicating with the water outlet body, and wherein the pump body defines a pump water passage both communicating with the inlet and outlet holes.

In order to achieve the above object, the present invention also provides a high-pressure cleaning apparatus, which comprises the pump assembly mentioned above.

The invention has the beneficial effect that the pump assembly of the present invention is provided with a heat dissipating portion that can conduct heat transfer to the sealed portion, so that the heat generated by the transmission structure in the sealed portion can be dissipated through the water flowing out of the heat dissipating portion to dissipate heat, thereby the heat dissipation of the pump assembly is achieved.

DESCRIPTION OF EMBODIMENTS

Figure 1:
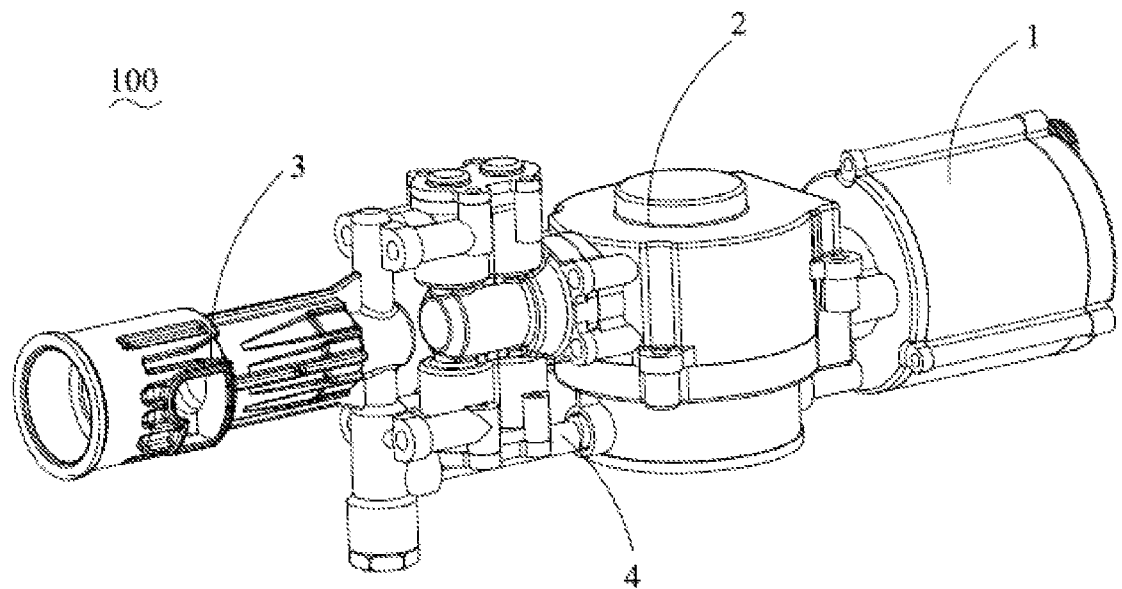
FIG. 1 is a perspective view of a pump assembly of the present invention.

The present invention will be described in detail below with reference to the drawings and specific embodiments.

Referring to FIG. 1 to FIG. 9, the pump assembly 100 of the present invention includes a motor 1, a transmission assembly 2 driven by the motor 1, a water pump 3 connected to the transmission assembly 2, and a water flow passage 4. The water flow passage 4 includes a motor water flow passage, a transmission-assembly water flow passage and a pump water flow passage which are connected together. The motor water flow passage, the transmission-assembly water flow passage and the pump water flow passage are connected sequentially.

The motor 1 may be a DC brushless motor, which includes a driving shaft 11, a motor stator and rotor assembly 12, a main body portion 13 that is sleeved on a circumferential side of the motor stator and rotor assembly 12, and a water outlet end cover 14 and a water inlet end cover 15 which are disposed at both ends of the main body portion 13 and are hermetically connected to the main body portion 13. The main body portion 13, the water outlet end cover 14 and the water inlet end cover 15 are all double-layered structures and respectively form a first water passage 150 in the water inlet end cover 15, a second water passage 130 in the main body portion and a third water passage 140 in the water outlet end cover 14. The first water passage 150, the second water passage 130 and the third water passage together form a motor water flow passage. The motor stator and rotor assembly 12 is an already existing structure and will not be described herein.

Figure 3:
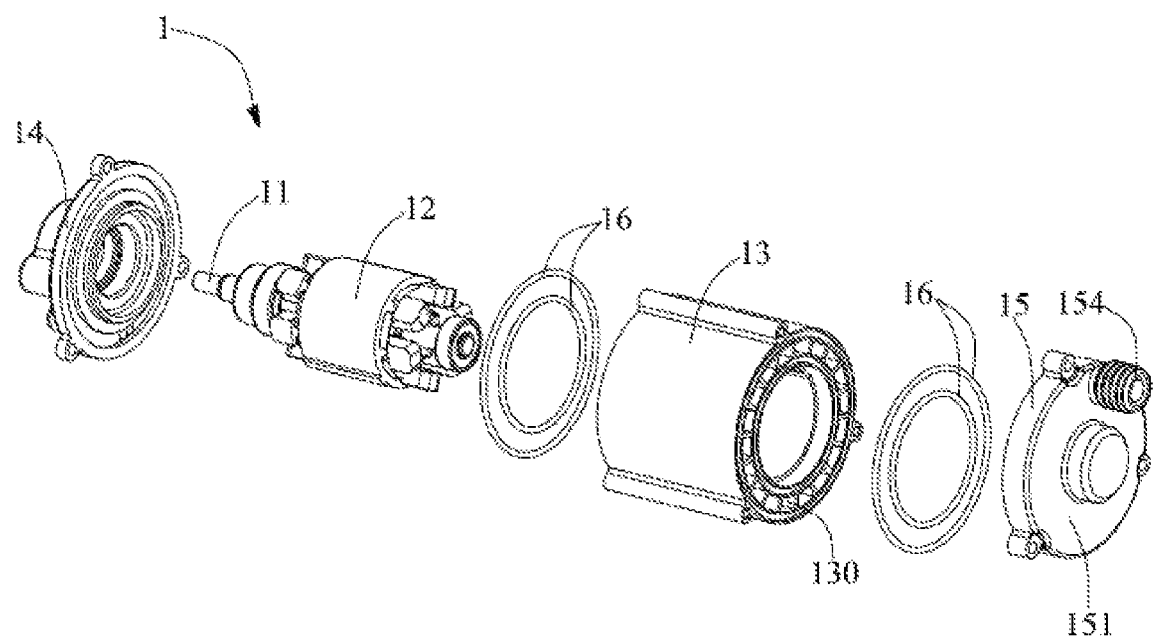
FIG. 3 is an exploded perspective view of the motor of FIG. 2.
Figure 4:
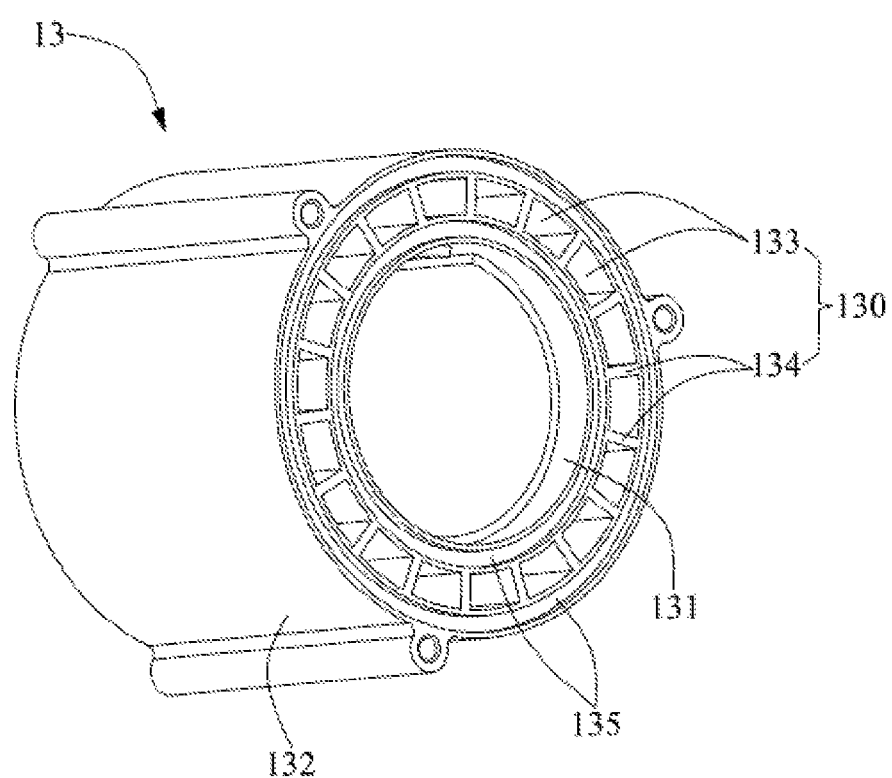
FIG. 4 is a schematic view of the main body portion of FIG. 3.
Figure 5:
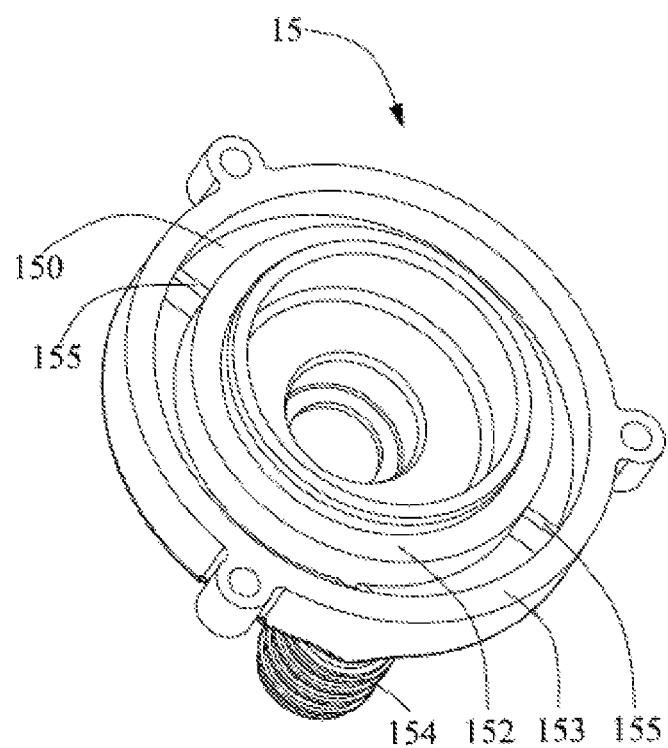
FIG. 5 is a schematic view showing the structure of the inlet cover of FIG. 3.

Referring to FIG. 3 to FIG. 5, the main body portion 13 includes a first circumferential wall 131 annularly disposed on the circumferential side of the motor stator and rotor assembly 12, a second circumferential wall 132 annularly disposed outside the first circumferential wall 131, and a plurality of heat dissipation ribs 134 which divide the second water passage 130 between the first circumferential wall 131 and the second circumferential wall 132 into a plurality of sub-channels 133. Preferably, the central axes of the first circumferential wall 131, the second circumferential wall 132 and the driving shaft 11 are collinear. The sub-channels 133 are evenly arranged along the circumferential direction of the main body portion 13.

In particular, both ends of the first circumferential wall 131 and the second circumferential wall 132 of the main body portion 13 are provided with a sealing groove 135 for receiving a sealing ring. An O-ring 16 is respectively provided between the water inlet end cover 15 and the main body portion 13, the water outlet end cover 14 and the main body portion 13. In this way, after the water inlet end cover 15, the main body portion 13 and the water outlet end cover 14 are assembled, the motor 1 is sealed, which improves the waterproof rating of the motor 1.

Referring to FIG. 5 and FIG. 3, the water inlet end cover 15 includes a bottom plate 151 and a first side wall 152 and a second side wall 153 extending from the bottom plate 151 toward the main body portion 13. The bottom plate 151 is provided with a water inlet connector 154 extending through the bottom plate 151 for water flowing into the second water passage 130. The first side wall 152 and the second side wall 153 form a first water passage 150, and the water inlet connector 154 communicates with the first water passage 150.

In particular, at least two water baffle plates 155 connecting the first side wall 152 with the second side wall 153 are disposed in the first water passage 150, and the heights of the two water baffle plates 155 are smaller than the height of the first water passage 150. Preferably, the two water baffle plates 155 are symmetrically disposed to divide the first water passage 150 into upper and lower portions. Two water baffle plates 155 divide the first water passage 150 into upper and lower portions. Under normal conditions, after the water enters, it will fall directly to the bottom and be sucked away. By setting the water baffle plates 155, the water flow will be blocked to ensure that the water preferentially enters the upper part of the first water passage 150, and then uniformly enters the second water passage 130, and further flows through each of the sub-channels 133. Of course, the water baffle plates 155 are not limited to two, and may be provided with four or more symmetrically arranged.

A plurality of water baffle plates 155 are used to sufficiently cool the motor 1 and prevent the water that flows in through the water inlet connector 154 from falling directly to the bottom of the first water passage 150 due to the gravity, and then flowing through the sub-channel 133 at the bottom of the main body portion 13, This causes the motor 1 to dissipate heat unevenly. That is, regardless of whether the water flowing in through the water inlet connector 154 is a pressurized water source or a non-pressure water source, it can flow from each sub-channel 133 of the main body portion 13, and the motor 1 can be well cooled.

Figure 6:
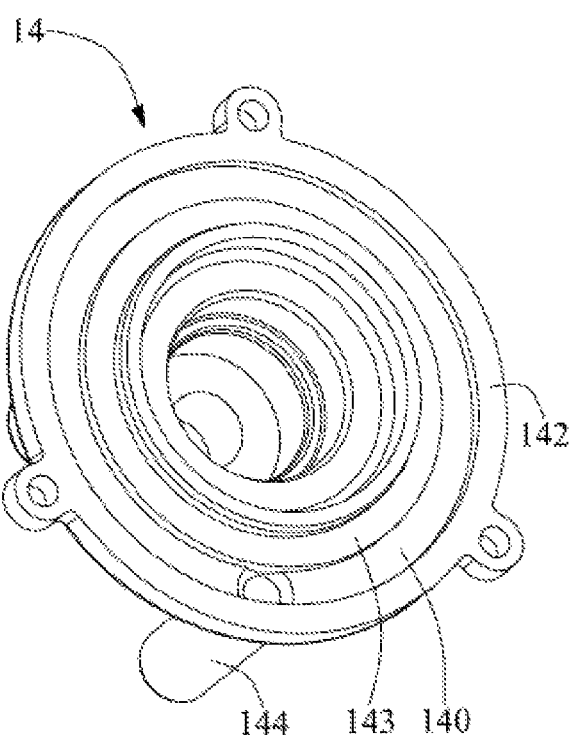
FIG. 6 is a schematic view showing the structure of the outlet cover of FIG. 3.

Referring to FIG. 6 and FIG. 3, the water outlet end cover 14 includes a bottom wall (not labeled) and a first side wall 142 and a second side wall 143 extending from the bottom wall toward the main body portion 13. The bottom wall is provided with a water outlet connector 144 extending through the bottom wall for water to flow out of the second water passage 130. The first side wall 142 and the second side wall 143 form a third water passage 140, and the water outlet connector 144 is in communication with the third water passage 140.

The water flowing in from the water inlet connector 154 of the water inlet end cover 15 flows through the first water passage 150, the second water passage 130, and the third water passage 140 in sequence, and then flows out through the water outlet connector 144. Each of the sub-channels 133 naturally forms a plurality of cooling passages to cool the motor 1 uniformly.

Figure 7:
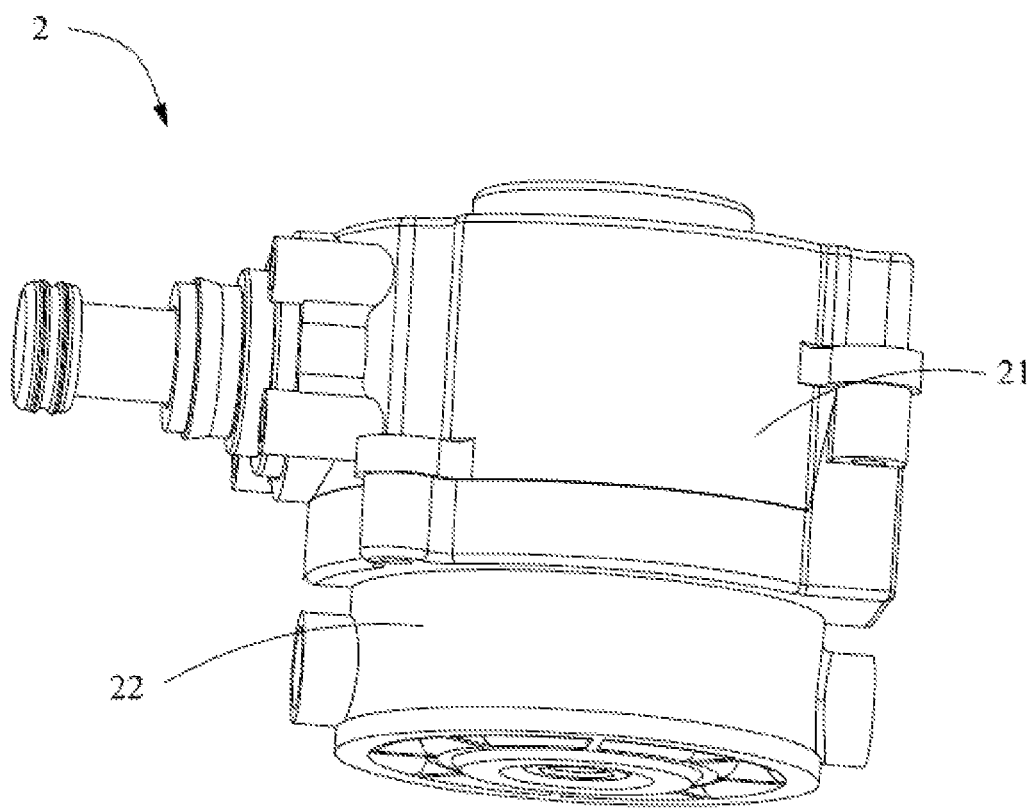
FIG. 7 is a perspective view of the transmission assembly of FIG. 2.

Referring to FIG. 7, the transmission assembly 2 includes a sealing portion 21, a heat dissipating portion 22 for transferring heat with the sealing portion 21, and a transmission structure 23 disposed in the sealing portion 21. The heat generated by the transmission structure 23 in the sealing portion 21 can be dissipated through the liquid in the heat dissipating portion 22 to achieve heat dissipation of the pump assembly 100. Preferably, the heat dissipating portion 22 in this embodiment is located below the sealing portion 21 in order to achieve a better heat dissipating effect. At the same time, the heat dissipating portion 22 and the sealing portion 21 could be an integrated structure, and the sealing portion 21 is a two-layer structure. A communication space is formed in the two-layer structure of the sealing portion 21, and the communication space is the heat dissipating portion 22 and fluidly communicates with the water flow passage 4.

Figure 8:
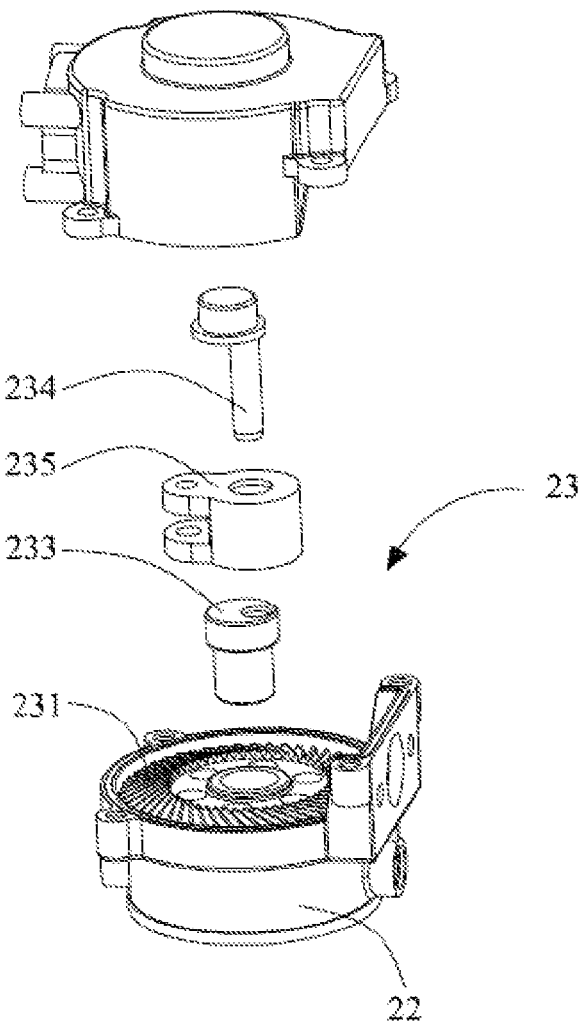
FIG. 8 is an exploded perspective view of the transmission assembly of FIG. 2.
Figure 10:
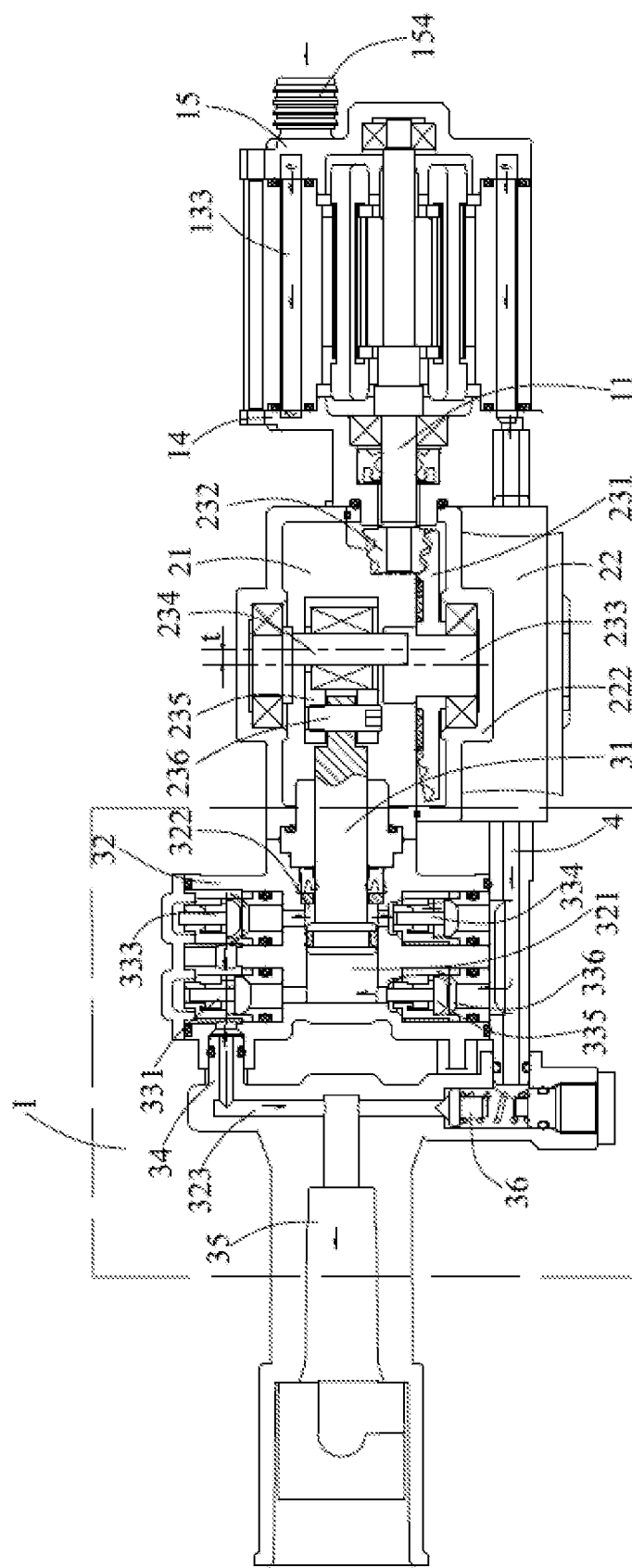
FIG. 10 is a cross-sectional view of the pump assembly of the present invention with the plunger in the bottom dead point.

Referring to FIG. 8 and FIG. 10, the transmission structure 23 includes a large gear 231, a small gear 232, a main shaft 233, an eccentric shaft 234, an eccentric block 235 and a sealing bracket 236. The large gear 231 is located above the heat dissipating portion 22, and the small gear 232 is sleeved at one end of the driving shaft 11 and engages with the large gear 231. The main shaft 233 is disposed in the heat dissipating portion 22. The eccentric shaft 234 is connected to the main shaft 233. The eccentric block 235 is mounted on the eccentric shaft 234. The sealing bracket 236 is disposed between the eccentric block 235 and the water pump 3, and the extending direction of the main shaft 233 is vertical to that of the driving shaft 11.

In particular, the transmission structure 23 in the sealing portion 21 may be lubricated by a lubricating medium injecting into the sealing portion 21, and the lubricating medium may be lubricating oil. On the one hand, the lubricating medium fully lubricates all the transmission structures 23 in the sealing portion 21, thereby avoiding the occurrence of poor lubrication caused by grease lubrication, reducing product noise and improving the life of the components. On the other hand, the lubricating medium can accelerate the heat transferred to the liquid in the heat dissipating portion 22, thereby the heat is carried away by the outflow of the liquid.

Figure 9:
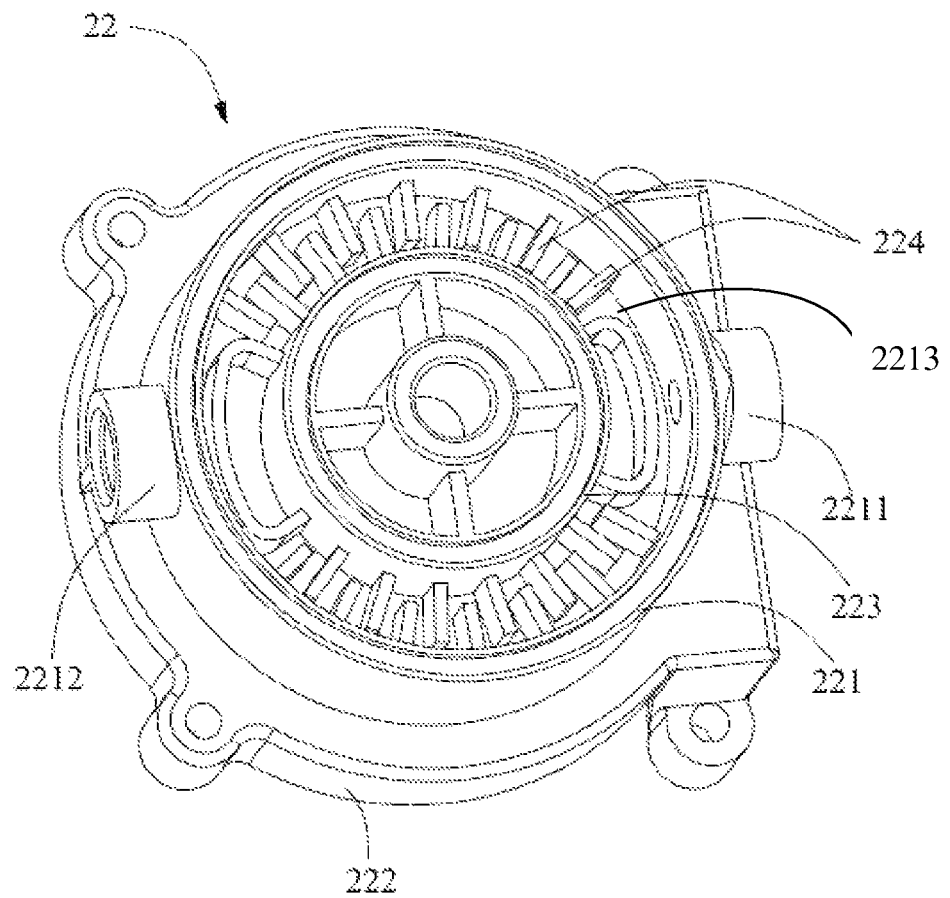
FIG. 9 is a schematic view of the heat dissipating portion of FIG. 7.

Referring to FIG. 9, the heat dissipating portion 22 includes an outer sidewall 221, an upper cover 222 located above the outer sidewall 221, and a base (not shown) located below the outer sidewall 221. The outer sidewall 221 is provided with a water inlet 2211 and a water outlet, 2212. A water passage 2213 is formed between the water inlet 2211 and the water outlet 2212. The water inlet 2211, the water outlet 2212 and the water passage 2213 form a water flow passage of the transmission assembly. Specifically, the outer sidewall 221, the upper cover 222, and the base of the heat dissipating portion 22 are enclosed as being water passage in the heat dissipating portion 22. The water inlet 2211 is in fluid communication with the water outlet connector 144 of the water outlet end cover 14, and the water outlet 2212 is in fluid communication with an inlet hole 38 of the water pump 3.

In particular, the heat dissipating portion 22 further includes an inner sidewall 223 located in the inside of the outer sidewall 221 for arranging the water passage in the heat dissipating portion 22 as being an annular structure, thereby enhancing the heat dissipating effect of the liquid. In addition, both ends of the outer sidewall 221 and the inner sidewall 223 are provided with sealing grooves (not labeled) for accommodating the sealing ring for enhancing the sealing property of the sealing portion 21 and the heat dissipating portion 22.

In particular, a plurality of metal heat dissipating fins 224 are vertically disposed in the water passage, so the heat dissipating effect of the heat dissipating portion 22 can be improved.

Figure 2:
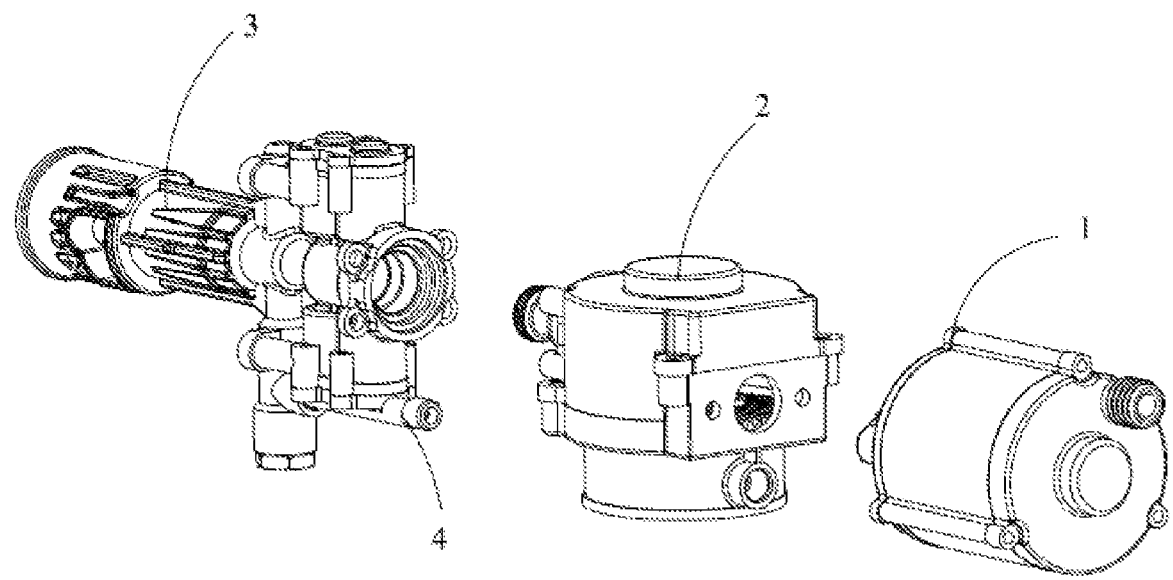
FIG. 2 is an exploded perspective view of the pump assembly of the present invention.

Referring to FIG. 10 to FIG. 14 in combination with FIG. 2, the water pump 3 includes a plunger 31 connected to the transmission structure 23, a pump body 32, four check valve assemblies symmetrically distributed on the upper and lower sides of the plunger 31, a water pump water flow passage in the pump body 32 and a water outlet body 35 communicating with the water outlet hole 34 of the pump body 32. In the present embodiment, the water pump 3 has one piston and double chambers, and the plunger chambers 321 and 322 are respectively disposed on the left and right sides of the pump body 32, so that the water sucked and pressed can be realized during the left-right reciprocating motion of the plunger 31, thereby a large flow function of the single plunger is achieved.

Figure 14:
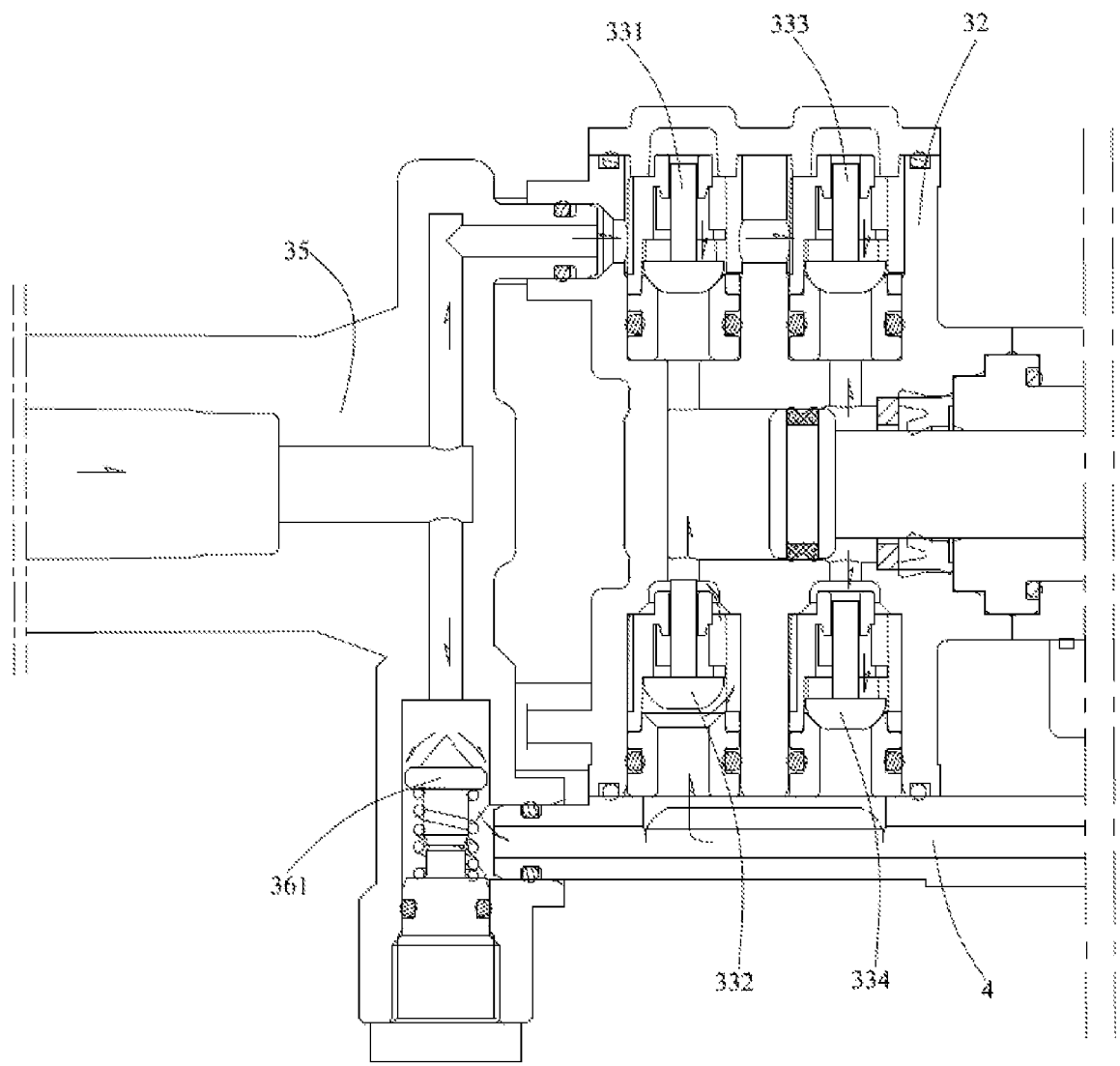
FIG. 14 is a view showing the working state of the safety valve when the water outlet body of the pump assembly of the present invention is blocked.

In particular, in the present embodiment, the water pump 3 further includes a safety valve 36 mounted on the water outlet body 35. Referring to FIG. 14, when the water discharge nozzle (not shown) on the water outlet body 35 is blocked during the operation of the water pump, the water pressure in the water outlet body 35 will immediately rise, and the water pressure will immediately react on the two check valve assemblies 331, 333 located on a top side of the pump body 32 and make them closed. At the same time, the water pressure acts on the safety valve 36 below the water outlet body 35. The valve core 361 of the safety valve 36 is immediately opened under the action of the return water pressure, and the high-pressure return water is depressurized into the water flow passage 4. After the water pressure is released, the valve core 361 is immediately returned to the closed state. With this arrangement, it is possible to avoid damage to the pump body 32 and the water gun (not shown) that communicates with the pump body 32 when the nozzle is blocked.

Figure 11:
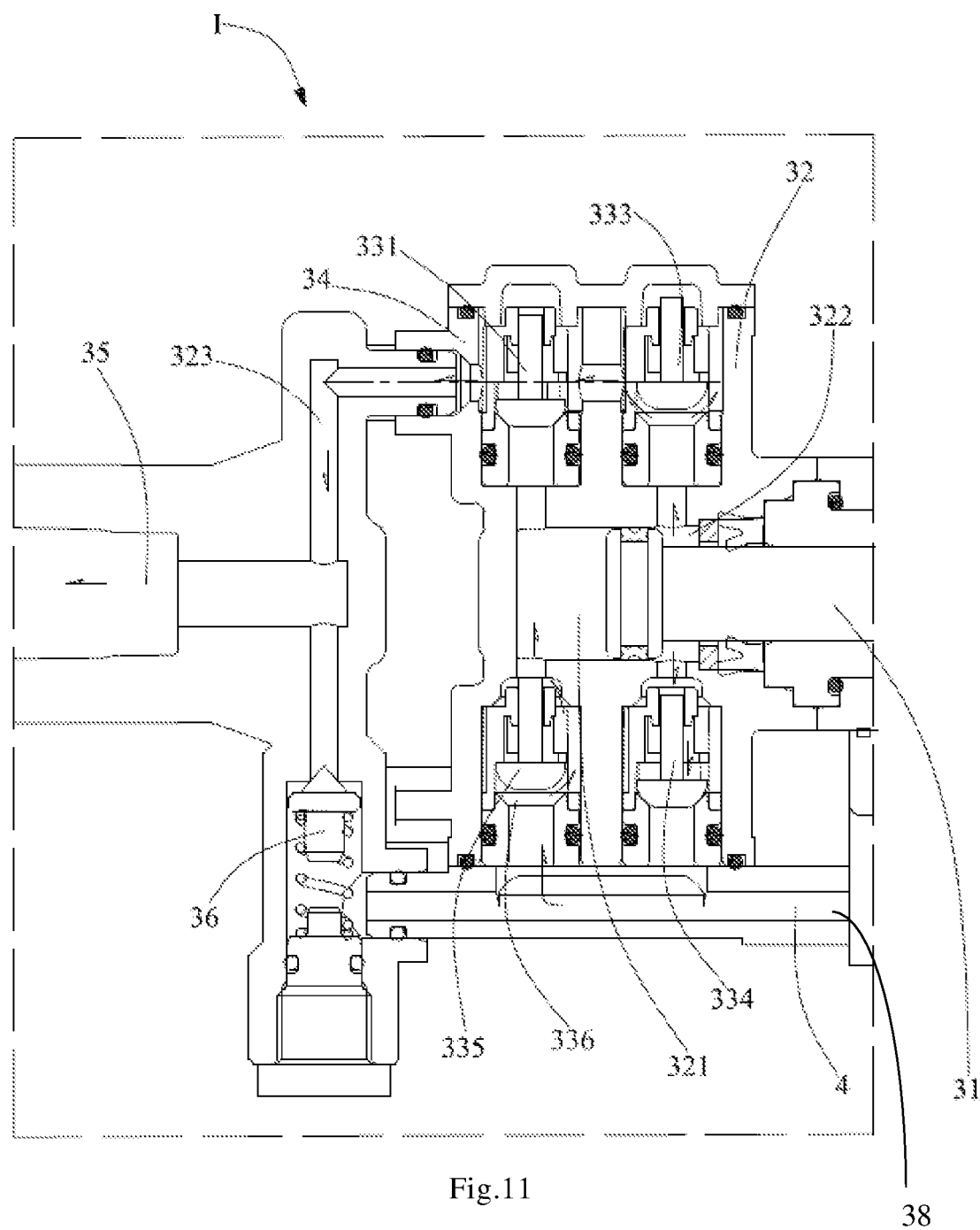
FIG. 11 is a partial enlarged view of the area I in FIG. 10.

The working principle of the water pump 3 will be described below with reference to FIGS. 10 to 14:

When the plunger 31 of the water pump 3 is at the bottom dead point position as shown in FIGS. 10 and 11, the plunger chamber 321 on the left side of the pump body 32 is in a vacuum state due to the evacuation of the plunger 31, thereby the check valve assembly 331 on the upper left side is closed and the valve core 335 of the check valve assembly 332 on the lower left side of the pump body 32 is disengaged from the valve seat 336 to form a water inlet. The water flowing into the water flow passage 4 through the water outlet 2212 of the heat dissipating portion 22 is sucked into the plunger chamber 321 on the left side of the pump body 32. Then, due to the movement of the plunger 31, the liquid in the plunger chamber 322 on the right side of the pump body 32 is pushed out to the check valve assembly 332 on the upper right side, and enters the water outlet body 35 through the pump body 32 and the valve passage 323 on the left side. The check valve assembly 334 on the lower right side is simultaneously closed. In this process, the left side of the plunger 31 sucks water and the right side of the plunger 31 presses water. Refer to the water flow arrow in FIGS. 10 and 11 for the opening and closing of each check valve assembly and the direction of water flow during water absorption and water pressed.

Figure 12:
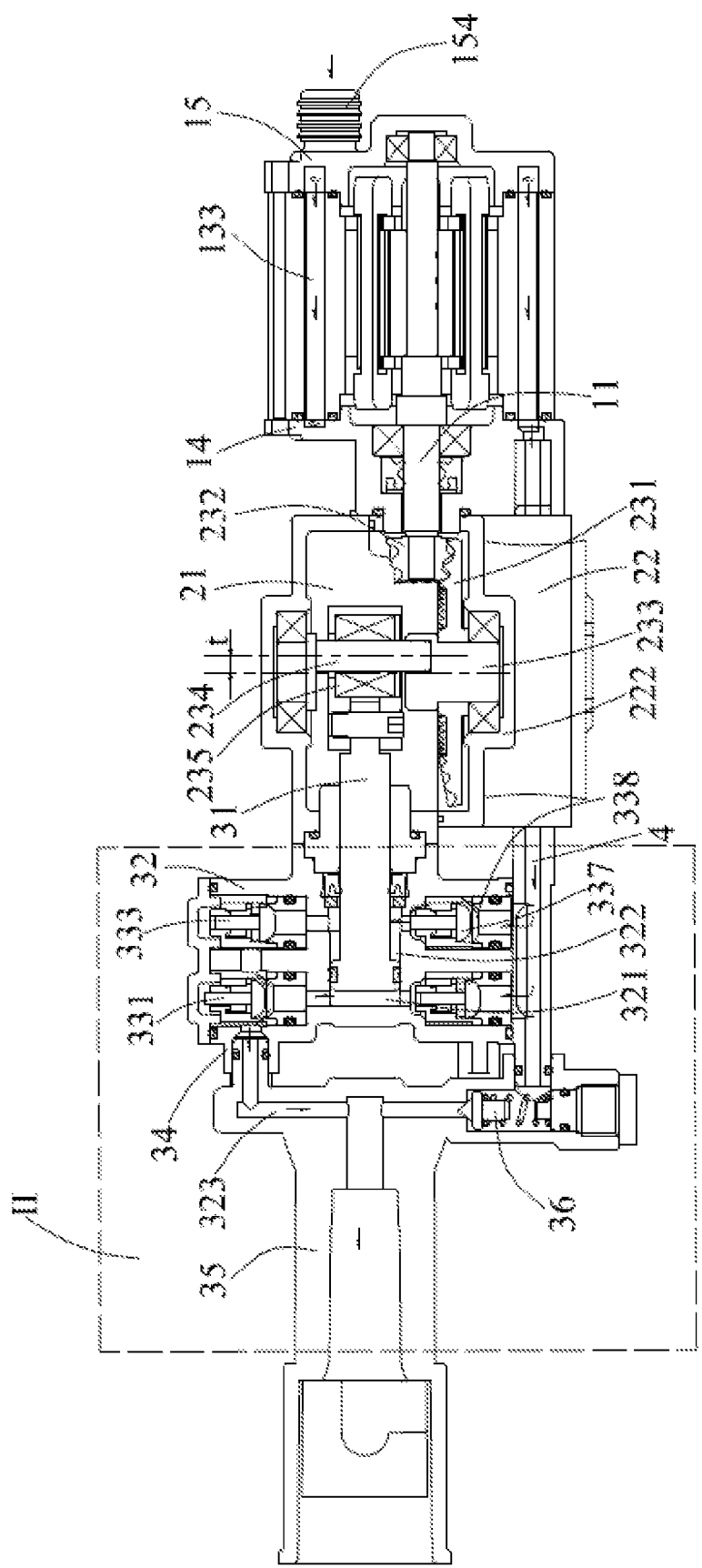
FIG. 12 is a cross-sectional view of the pump assembly of the present invention with the plunger in the top dead point.
Figure 13:
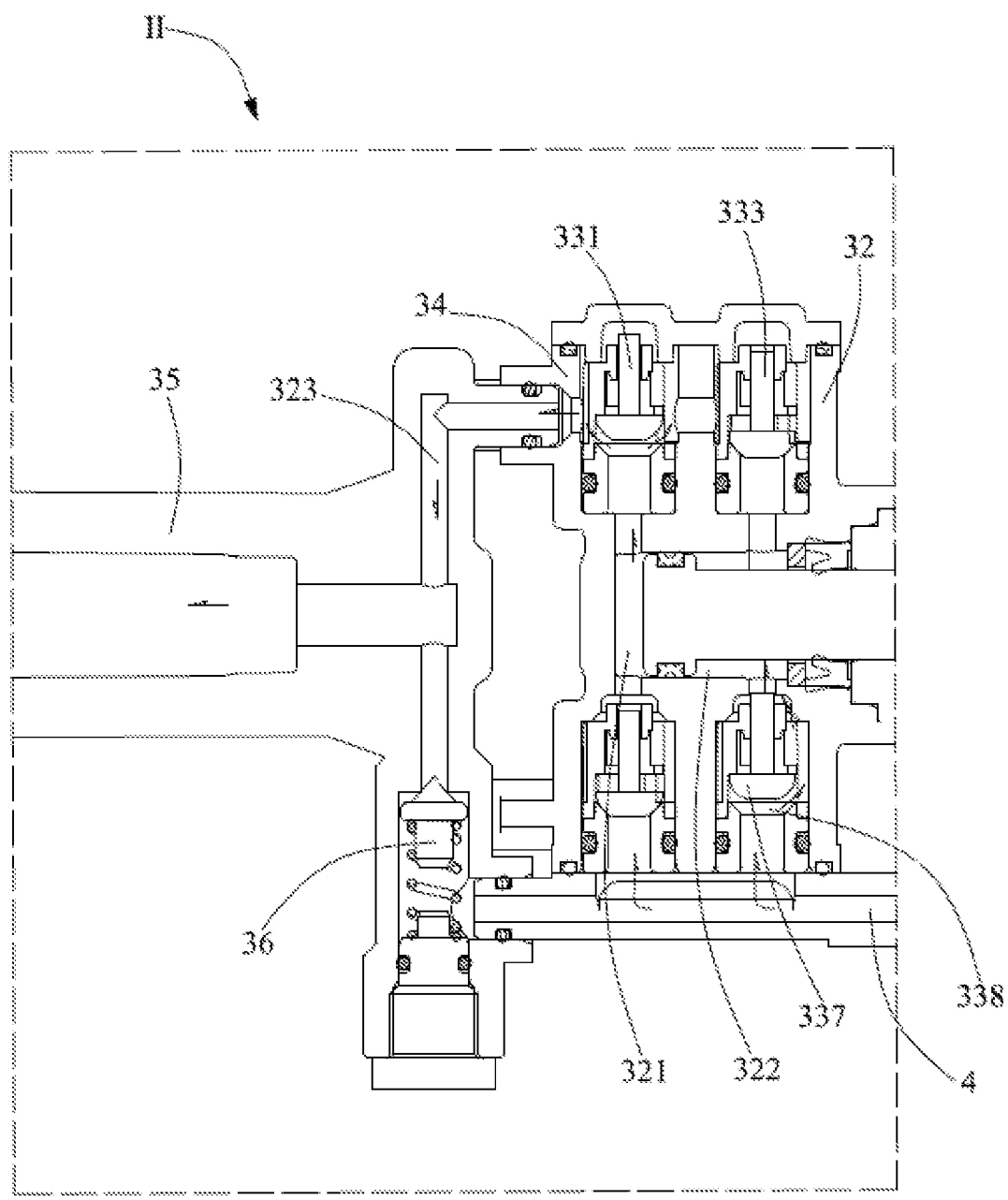
FIG. 13 is a partial enlarged view of the area II in FIG. 12.

When the plunger 31 of the water pump 3 is at the top dead point position as shown in FIGS. 12 and 13, the plunger chamber 322 on the right side of the pump body 32 is in a vacuum state due to the evacuation of the plunger 31, thereby the valve assembly 332 on the upper right side is closed, and the valve core 337 of the check valve assembly 334 on the lower right side of the pump body 32 is disengaged from the valve seat 338 to form a water flow inlet. The water flowing into the water flow passage 4 through the water outlet 2212 of the heat dissipating portion 22 is sucked into the plunger chamber 322 on the right side of the pump body 32. Then, due to the movement of the plunger 31, the liquid in the plunger chamber 321 on the left side of the pump body 32 is pushed out to the check valve assembly 331 on the upper left side, and enters the water outlet body 35 through the pump body 32 and the valve passage 323 on the left side. The check valve assembly 334 on the left lower side is simultaneously closed. In this process, the right side of the plunger 31 sucks water and the left side of the plunger 31 presses water. Refer to the water flow arrow in FIGS. 12 and 13 for the opening and closing of each check valve assembly and the water flow direction of the direction of water flow during water absorption and water pressed.

The rotation of the pump assembly 100 is specifically as follows: First, the small gear 232 in the sealing portion 21 is rotated by the driving shaft 11 on the motor 1, the small gear 232 drives the large gear 231 to rotate, and the large gear 231 drives the main shaft 233 to rotate and change the rotation direction. Secondly, the rotation of the eccentric shaft 234 and the eccentric block 235 on the main shaft 233 drives the plunger 31 to reciprocate to convert the rotation of the driving shaft 11 into a linear motion of the plunger 31. Then, the reciprocating motion of the plunger 31 drives the two water inlet check valve assemblies 332, 334 and the two water outlet check valve assemblies 331, 333 disposed inside the pump body 32 to suck and press water. Finally, a high pressure output of the water flow is realized. In the present embodiment, the eccentric distance of the eccentric shaft 234 is t, and the stroke of the plunger 31 is 2t.

The liquid in the water flow passage 4 sequentially flows through the motor water flow passage, the transmission assembly water flow passage, and the pump water flow passage. In addition, in order to improve the heat dissipating effect of the pump assembly 100, the water in the water flow passage 4 can also flow through the motor water flow passage and the water flow passage of the transmission assembly respectively, and then flow into the water pump water flow passage after confluence, thereby separately dissipating heat from the motor 1 and the transmission assembly 2.

The present invention also provides a high-pressure cleaning apparatus including the pump assembly 100. By using the pump assembly 100, the heat dissipating performance of the high-pressure cleaning apparatus is improved, and the service life of the high-pressure cleaning apparatus is prolonged.

In summary, the pump assembly 100 of the present invention includes a motor 1, a transmission assembly 2 driven by the motor 1, a water pump 3 connected to the transmission assembly 2, and a water flow passage 4. The transmission assembly 2 includes a sealing portion 21, a heat dissipating portion 22 that can heat-conductive with the sealing portion 21, and a transmission structure 23 that is disposed in the sealing portion 21. The heat dissipating portion 22 is in fluid communication with the water flow passage 4. The pump assembly 100 is provided with a heat dissipating portion 22 for heat transfer to the sealing portion 21, so that the heat generated by the transmission structure 23 in the sealing portion 21 can be dissipated through the liquid in the heat dissipating portion 22, thereby achieving the heat dissipating effect of the pump assembly 100.

The above embodiments are only used to illustrate the technical solutions of the present invention and are not limited thereto. Although the present invention is described in detail with reference to the preferred embodiments, those skilled in the art should understand that the technical solutions of the present invention may be modified or equivalently substituted without departing from the spirit and scope of the technical solutions of the present invention.

I claim:

1. A pump assembly comprising:
   an electric motor;
   a transmission assembly driven by the electric motor and including a sealing portion, a transmission mechanism received in and sealed by the sealing portion, and lubricated with a lubricating medium injected into the sealing portion, and a heat dissipating portion connected to the sealing portion for transferring heat with the sealing portion;
   a water pump driven by the electric motor through the transmission assembly; and
   a water flow passage, the water flow passage comprising a motor water flow passage, a transmission-assembly water flow passage, and a pump water flow passage which are directly connected sequentially,
   wherein the motor water flow passage is provided in the electric motor, the transmission-assembly water flow passage is provided in the heat dissipating portion of the transmission assembly, and the pump water flow passage is provided in the pump, and
   the water flow passage extends from the electric motor, through the heat dissipating portion and to the water pump,
   wherein the sealing portion is disposed to conduct heat with the heat dissipating portion, so that heat generated by the transmission mechanism is transferred through the lubricating medium to the sealing portion and the heat dissipating portion, and dissipated by water passing through the water flow passage extending through the heat dissipating portion.

2. The pump assembly according to claim 1, wherein the heat dissipating portion has a water inlet and a water outlet both for the water passing through the transmission-assembly water flow passage to dissipate the heat generated by the transmission mechanism.

3. The pump assembly according to claim 2, wherein a water passage is formed between the water inlet and the water outlet, and wherein the transmission assembly water flow passage is formed together by the water inlet, the water outlet and the water passage.

4. The pump assembly according to claim 3, wherein a plurality of metal heat dissipating ribs are disposed in the water passage and wherein the water outlet is connected to the water pump.

5. The pump assembly according to claim 4, wherein the water passage is configured with an annular shape, and wherein the metal heat dissipating ribs are uniformly distributed in the water passage.

6. The pump assembly according to claim 2, wherein the electric motor comprises a main body portion, a first end cover and a second end cover respectively disposed on two opposite ends of the main body portion, and the water passes through the motor water flow passage of the motor to dissipate heat generated by the electric motor.

7. The pump assembly according to claim 6, wherein the first end cover defines a first water channel for the water passing through, and wherein the main body portion defines a second water channel fluidly communicating with the first water channel, and wherein the second end cover defines a third water channel fluidly communicating with the second water channel.

8. The pump assembly according to claim 7, wherein the motor water flow passage is formed by the first water channel, the second water channel and the third water channel.

9. The pump assembly according to claim 7, wherein the first end cover defines a water inlet connector communicating with the first water channel, and wherein the second end cover defines a water outlet connector communicating with the third water channel and engaging with the water inlet of the heat dissipating portion.

10. The pump assembly according to claim 7, wherein at least two water baffle plates are disposed in the first water channel for the water uniformly passing through the second water channel, and wherein a plurality of heat dissipating ribs are located in the second water channel, and wherein the second water channel is divided into a plurality of sub-channels which are uniformly distributed along a circumferential direction of the main body portion.

11. The pump assembly according to claim 2, wherein the water pump comprises a pump body and a water outlet body connected to the pump body, and wherein the pump body has an inlet hole connected to the water outlet of the transmission assembly and an outlet hole communicating with the water outlet body, and wherein the pump body defines the pump water flow passage communicating with both the inlet and outlet holes.

12. A high-pressure cleaner comprising a pump assembly, the pump assembly including:
an electric motor;
a transmission assembly driven by the electric motor and including a sealing portion, a transmission mechanism received in and sealed by the sealing portion, and lubricated with a lubricating medium injected into the sealing portion, and a heat dissipating portion connected to the sealing portion for transferring heat with the sealing portion;
a water pump driven by the electric motor through the transmission assembly; and
a water flow passage, the water flow passage comprising a motor water flow passage, a transmission-assembly water flow passage, and a pump water flow passage which are directly connected sequentially,
wherein the motor water flow passage is provided in the electric motor, the transmission-assembly water flow passage is provided in the heat dissipating portion of the transmission assembly, and the pump water flow passage is provided in the pump, and
the water flow passage extends from the electric motor, through the heat dissipating portion and to the water pump,
wherein the sealing portion is disposed to conduct heat with the heat dissipating portion, so that heat generated by the transmission mechanism is transferred through the lubricating medium to the sealing portion and the heat dissipating portion, and dissipated by water passing through the water flow passage extending through the heat dissipating portion.

13. The high-pressure cleaner according to claim 12, wherein the heat dissipating portion has a water inlet and a water outlet both for the water passing through the transmission-assembly water flow passage to dissipate the heat generated by the transmission mechanism.

14. The high-pressure cleaner according to claim 13, wherein a water passage is formed between the water inlet and the water outlet, and wherein the transmission assembly water flow passage is formed together by the water inlet, the water outlet and the water passage.

15. The high-pressure cleaner according to claim 14, wherein a plurality of metal heat dissipating ribs are disposed in the water passage and wherein the water outlet is connected to the water pump.

16. The high-pressure cleaner according to claim 15, wherein the water passage is configured with an annular shape, and wherein the metal heat dissipating ribs are uniformly distributed in the water passage.

17. The high-pressure cleaner according to claim 13, wherein the electric motor comprises a main body portion, a first end cover and a second end cover respectively disposed on two opposite ends of the main body portion, and the water passes through the motor water flow passage of the motor to dissipate heat generated by the electric motor.

18. The high-pressure cleaner according to claim 17, wherein the first end cover defines a first water channel for the water passing through, and wherein the main body portion defines a second water channel fluidly communicating with the first water channel, and wherein the second end cover defines a third water channel fluidly communicating with the second water channel.

19. The high-pressure cleaner according to claim 18, wherein the motor water flow passage is formed by the first water channel, the second water channel and the third water channel.

20. The high-pressure cleaner according to claim 18, wherein the first end cover defines a water inlet connector communicating with the first water channel, and wherein the second end cover defines a water outlet connector communicating with the third water channel and engaging with the water inlet of the heat dissipating portion.

* * * * *